June 29, 1937. J. DUNLOP 2,085,076
MOVING STAIRWAY
Filed Dec. 18, 1934 2 Sheets-Sheet 1
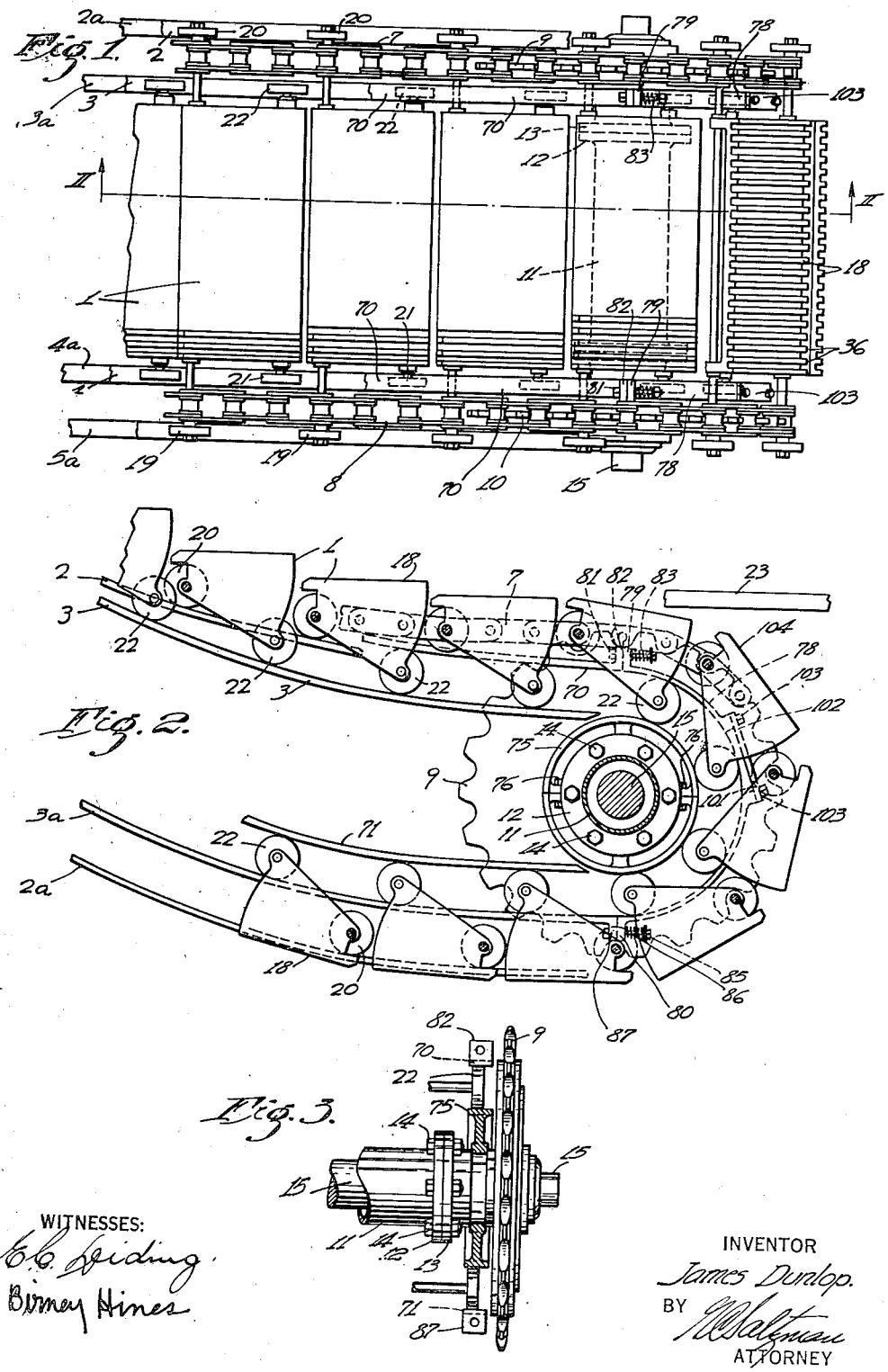
INVENTOR
James Dunlop.
BY
ATTORNEY
WITNESSES:

June 29, 1937.    J. DUNLOP    2,085,076
MOVING STAIRWAY
Filed Dec. 18, 1934    2 Sheets-Sheet 2
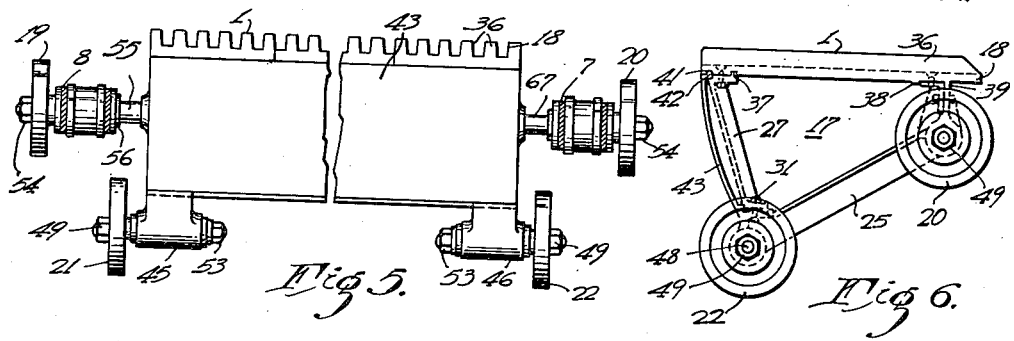
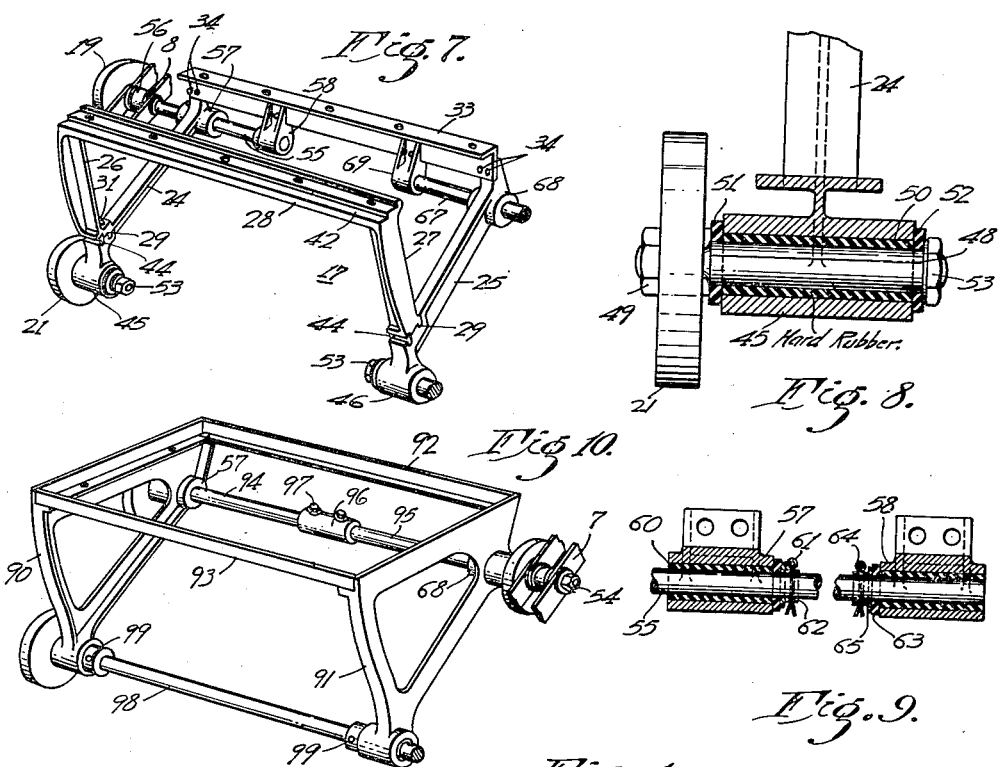
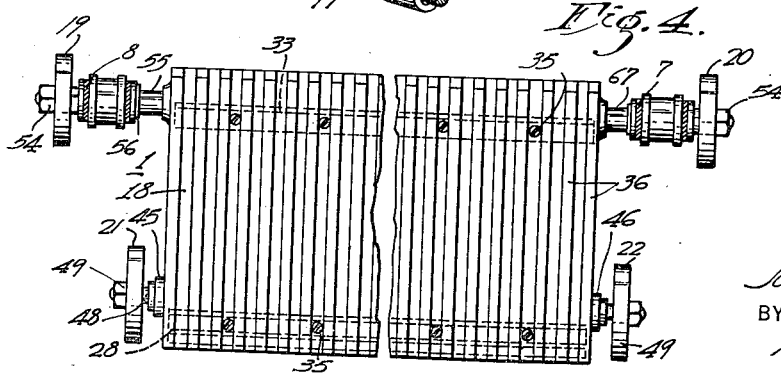
INVENTOR
James Dunlop.
BY
ATTORNEY Patented June 29, 1937

2,085,076

UNITED STATES PATENT OFFICE 2,085,076

MOVING STAIRWAY

James Dunlop, Park Ridge, Ill., assignor to Westinghouse Electric Elevator Company, Chicago, Ill., a corporation of Illinois Application December 18, 1934, Serial No. 758,036

16 Claims. (Cl. 198—16)

My invention relates to moving stairways in which the steps are operated by endless gear chains disposed over a plurality of sprocket wheels.

One object of my invention is to provide a moving stairway which may be easily constructed and operated and which will be quiet and practically noiseless in operation.

Another object is to provide a moving stairway in which the steps and the parts thereof may be easily and quickly inspected and may be easily and quickly removed for repairs or replacement.

It is also an object to provide a moving stairway in which the treads of any one or all of the steps may be readily removed either for the purpose of permitting ready inspection and repair of the interior parts of the stairway or for the purpose of repairing and renewing the treads.

Other objects of the invention will, in part, be obvious and will, in part, appear hereinafter. For a clearer understanding of the invention, reference may be had to the following drawings, in which:

Figure 1 is a top plan view of the gear chains of sprocket wheels and steps of a moving stairway at its lower landing;

Fig. 2 is a view taken as a position along the line II—II of Fig. 1 with the steps shown only in outline and a portion of the lower landing being added.

Fig. 3 is a view partly in end elevation and partly in section of one of the gear chain sprocket wheels and a portion of the track for one of the trailing rollers of the steps shown in Figs. 1 and 2;

Fig. 4 is an enlarged top plan view, with the middle portion broken away, of one of the steps shown in Fig. 1;

Fig. 5 is a view in front elevation, with the central portion broken away, of the step shown in Fig. 4;

Fig. 6 is a view in end elevation of the step shown in Fig. 5;

Fig. 7 is a view in perspective of the frame for the step shown in Figs. 4, 5 and 6;

Fig. 8 is a view, partly in cross section and partly in front elevation, of one of the rear or trailing rollers disposed on one of the stub axles shown in Fig. 7;

Fig. 9 is a view in cross section of the mounting brackets for the left hand front axle of the step frame shown in Fig. 7; and Fig. 10 is a view, in perspective, of a modified form of the step frame shown in Fig. 7.

Referring more particularly to the drawings, I have illustrated the lower landing portion of a moving stairway as comprising an endless series of movable steps 1 disposed to be moved along their upper tracks 2, 3, 4 and 5 and their lower tracks 2ª, 3ª, 4ª and 5ª by a pair of gear chains 7 and 8 between an upper landing (not shown) and a lower landing 23. The gear chains are supported at the lower landing by a pair of sprocket wheels 9 and 10.

The sprocket wheels 9 and 10 are connected by a sleeve 11 having suitable flanges 12 bolted to suitable cooperating flanges 13 upon the inner portions of the sprocket wheels by a plurality of bolts 14. As shown, the sleeve provides a firm and fixed connection between the sprocket wheels at the lower landing so that they will rotate in unison with each other in the operation of the stairway. The sprocket wheels and their connecting sleeve 11 are rotatably mounted upon a shaft or axle 15 which may be supported at its ends in any suitable manner.

Referring to Figs. 4 to 9, each of the steps 1 comprises a frame 17, a step tread 18, a pair of leading rollers 19 and 20, and a pair of trailing rollers 21 and 22.

The step frame 17 comprises a pair of end brackets 24 and 25 which support the depending legs 26 and 27 of a step riser support 28 which connects the two end brackets and affords a firm foundation for one edge of the step tread 18. Each of the lower ends of the legs 26 and 27 is provided with a projection 29 (Fig. 7) which fits into a cooperating slot or recess in the rear ends of the end brackets 24 and 25 and is firmly secured in that position by a bolt or rivet 31. The front ends of the end brackets 24 and 25 are connected by a step angle iron 33, the ends of which are disposed in recesses in the brackets and secured in such recesses by means of a plurality of rivets 34. The riser support 28, the end brackets 24 and 25 and the angle iron 33, as secured together, provides a rigid, compact frame for the step tread 18.

The tread 18 may be constructed of any suitable material, preferably of molded fibrous material with a heat hardened binder and is removably mounted upon the riser support 28 and the angle iron 33 by means of a plurality of screws 35. The tread is constructed in a plurality of sections, preferably in three sections, each of which is provided with a plurality of cleats 36 on its upper surface and with a groove 37 and a pair of projections 38 and 39 on its under surface. The groove 37 fits over a cooperating projection on the upper face of the riser support 28 and the projections 38 and 39 are disposed to bear against the sides of the angle iron 32 so that when the step tread sections are firmly secured in position by their screws 35, they will add to the rigidity of the step frame and help to make a firm and steady stair step.

The under side of the stair tread 18 is also provided with a slot 41 which is disposed to cooperate with an offset portion 42 on the riser support 28 to receive the upper offset edge of a riser 43. The lower edge of the riser 43 is bent inwardly and downwardly and secured in a slot 44 formed by cooperating offset portions on the lower ends of the legs 26 and 27 and the upper faces of the rear ends or trailing axle supports 45 and 46 of the end brackets. The riser 43 may be constructed of any suitable material, preferably of a molded fibrous material with a heat hardened binder.

The trailing roller 21 is rotatably mounted upon the outer end of a stub axle 48 and is secured thereon by a suitable nut 49. The stub axle is mounted in the trailing axle support 45 by means of a resilient sleeve 50, preferably of rubber, retained in position by a pair of suitable washers 51 and 52. A nut 53 on the inner end of the stub axle holds the combination firmly in position. The resilient sleeve 50 grips the stub axle and prevents its rotation with the trailing roller. It also tends to prevent the transmission of noise and vibrations. The trailing roller 22 is mounted upon a stub axle disposed in the trailing roller support 46 in the same manner as the stub axle for the trailing roller 21 is mounted in its support.

The leading roller 19 is mounted upon the outer end of a front axle 55 which extends through a hollow pivot pin 56 in the gear chain 8. A nut 54 maintains the roller in position on its shaft. The inner end of the axle is disposed in an axle support 57 on the front end of the end bracket 24 and in an axle support bracket 58 attached to the angle iron brace 33.

As shown in Fig. 9, the front axle 55 is held in the bracket 57 by means of a suitable resilient bushing 60 preferably of rubber or similar material. A cotter pin 61 is passed through a collar 62 on the axle 55 to prevent its moving to the left. The extreme inner end of the axle 55 is mounted in the axle bracket 58 by means of a suitable resilient bushing 63 preferably of rubber, and is held in that bracket against movement to the right by a cotter pin 64 disposed in a sleeve 65. Inasmuch as the axle 55 is firmly mounted in and gripped by the resilient sleeves 60 and 63, it has no tendency to rotate with the front roller wheel 19. Also the resilient bushing tends to prevent any vibration passing from the wheel to the step or from the step to the axle, thus reducing the noise of operation and rendering the stairway more efficient in operation. The front roller 20 is disposed on a front axle 67 which extends through a pivot pin in the chain 4 and is mounted in brackets 68 and 69 in the same manner as the roller 19.

During the operation of the steps, the front portion of the step is carried by the front axles 55 and 67 extending through the chains 7 and 8, while the rear portion of the step is supported by the trailing rollers 21 and 22 which travel upon the upper track rails 3 and 4 when the step is in the uppermost position and which travel on the lower track rails 6 when the step is in the underneath position. A pair of guide rails 70 are provided for preventing the trailing wheels 21 and 22 from leaving the upper rails 3 and 4 and guide rails 71 are provided for preventing them from leaving the lower track rails 3ª and 4ª as the steps are moved along their course by the operation of the gear chains 7 and 8.

Heretofore, in the operation of moving stairways considerable noise has resulted from the use of fixed curved track rails and fixed curved guard rails for carrying the trailing rollers around the ends of the stairways. In order to eliminate as much of this noise as possible, I have provided a pair of novel end track rails and a pair of arcuate track guards resiliently biased toward the end track rails.

As shown in Figs. 2 and 3 the end track rail at each side comprises a circular track or pulley 75 adjacent to the sprocket wheel 9, in position to provide an extension to the track rail 3. The circular track 75 is mounted beside the gear wheel and concentric with its axis and comprises a pair of half members which are bolted together by means of a plurality of bolts 76. The circular track 75 may be firmly secured to the collar 11 so that it will rotate with the gear wheel 9 or it may be rotatably mounted upon the collar 11 so that it will normally rotate with the gear wheel or if any pressure is exerted upon it in the opposite direction, will rotate upon the collar instead of with it. However, if desired, the circular track may be cast integral with the gear wheel. That portion of the circular track which receives the rear rollers may be called an arcuate track although it keeps shifting its position as the circular track rotates.

As shown in Fig. 2, the trailing rollers will follow down the track rail 3 and slip upon the circular track rail 75 as the steps are carried around the lower end of the stairway. In order to press the trailing rollers against the circular track 75 to keep them from rattling and changing their position as the steps go around the lower end, I have provided an arcuate outer guard rail 78, the upper end of which is provided with a shoulder 79 and the lower end of which is provided with a shoulder 80. A bolt 81 passes through the shoulder 79 and a cooperating shoulder 82 on the end of the guard rail 78. A compression spring 83 is concentrically mounted on the right hand end of the bolt 81 to bias the shoulder 79 toward the shoulder 83. Similarly, a bolt 85 and a compression spring 86 bias the shoulder 80 on the under side of the circular guard 78 against a shoulder 87 on the inner end of the lower track rail 6. The compression springs 83 and 86 tend to maintain the arcuate guard rail 78 against the trailing rollers 22 and keep them in close contact with the circular track 75.

The circular track 75 and guard 78 adjacent to the sprocket wheel 10 are constructed in the same manner as those adjacent to the sprocket wheel 9.

It will be seen that as the steps move along the track rail 3 and around the circular track 75 to their underneath position on track 6, simultaneous engagement of the trailing rollers with the track rail 75 and the arcuate guard rail 78 will cause the rollers to reverse their direction of rotation and roll along without binding between the circular rail and the arcuate guide, because of the movement of the circular track 75 with the gear wheel 9.

If it is desired to remove a step at any time for replacement or repairs, the nuts 54 on the front axles may be removed, the cotter pins 61 and 64 removed, the wheels 19 and 20 taken off, and the axles forced inwardly out of the gear chains 7 and 8. This will free the front end of the step. The rear end of the step may be freed by removing some or all of the nuts 49 and 53, taking the trailing rollers 21 and 22 off their stub axles 48 and then forcing the stub axles 48 out of the brackets 45 and 46. The step may now be lifted upwardly or dropped downwardly and removed from its position in the stairway. If the step is to be replaced or if a new step is to be substituted for the old one, the operation may be effected by reversing the operation just described.

It will also be noted that each arcuate guard rail 78 is provided with an opening 101 which is normally closed by a removable segment 102 maintained in position by a plurality of stud bolts 103. If it is desired to remove a step when it is in the position shown by the step 104, the leading rollers and front axles may be removed as described, the cap segments 102 may be taken off and the step may then be lifted out of the stairway without taking off the trailing rollers, because the trailing rollers can come out through the openings 101. Hence it is seen that the step may be removed in this manner without dismantling the trailing rollers and their axles.

In Fig. 10, I have provided a modified form of stairway step comprising a pair of end brackets 90 and 91 connected by a front bar 92 and a rear bar 93. These parts may be riveted or bolted together to form a firm and substantial frame for the step. No tread is shown for this frame but any suitable tread may be provided for it. The front rollers of this step are mounted upon a front axle comprising two sections 94 and 95. These sections are mounted in rubber bushings in the axle supports 57 and 68 in the same manner as the front axles 55 and 67 in the step shown in Fig. 7, but their inner ends are connected by a split muff coupling 96 and bolts 97 instead of being supported by a pair of brackets. The trailing rollers are mounted upon the outer ends of a rear axle 98 disposed in rubber bushings and maintained in its correct position by a plurality of cotter pins 99.

When it is desired to remove the step of Fig. 10 from the stairway, it is first moved to the position occupied by the step 104 in Fig. 2, the nuts 54 are taken off, the bolts 97 and the muff coupling 96 are removed, the inner ends of the axle sections 94 and 95 are moved transversely so that they will not clash and are then pulled toward the center, the rubber collars 60 coming through the holes in the axle supports 57 and 68. This removes the front axle from the gear chains 7 and 8. The cap segments 102 disposed in the openings 101 are now removed so that the step may be now lifted outwardly with the trailing rollers coming out through the openings 101. Inasmuch as the trailing rollers are lifted out through the openings 101, they and their axle 98 need not be dismantled from the step when the step is to be removed from the stairway. When it is desired to replace the step, this operation is reversed.

From the foregoing description, it is seen that I have provided a moving stairway which may be easily and economically constructed, which will be quiet in operation and the parts of which may be removed and repaired or replaced without dismantling or removing very much of the apparatus.

Although I have illustrated and described only one embodiment and a slight modification thereof of my invention, it is to be understood that many modifications thereof and changes therein may be made without departing from the spirit and scope of the invention.

I claim as my invention:

1. In a moving stairway step, a pair of end brackets, a pair of step tread supporting members mounted on the end brackets, a step tread removably mounted on the supporting members, a riser having its horizontal edges disposed in cooperating grooves in the end brackets and in the step treads whereby the riser is retained in operating position while the tread is secured to the step frame, a pair of leading rollers rotatably mounted upon the front portions of the end brackets, and a pair of trailing rollers rotatably mounted upon the rear portions of the end brackets.

2. In a moving stairway step, a frame provided with a recess, a step tread provided with a recess in its under side, means for fastening the tread to the frame, a riser having its lower edge disposed in the recess in the frame and its upper edge disposed in the recess in the tread whereby the riser is retained in operating position while the tread is secured to the frame, a pair of leading rollers rotatably mounted on the front portion of the frame, and a pair of trailing rollers rotatably mounted on the rear portion of the frame.

3. In a moving stairway step, a pair of end brackets provided with a pair of recesses in their upper surfaces, a pair of parallel spaced-apart supporting members having their outer and lower portions disposed in the recesses in the end brackets, means for securing the supporting members in said recesses, a step tread removably mounted on the upper surface of the supporting members, a pair of leading rollers rotatably mounted on the front portions of the end brackets and a pair of trailing rollers rotatably mounted on the rear portions of the end brackets.

4. In a moving stairway step, a pair of end brackets provided with recesses in their upper surfaces, a pair of parallel spaced apart supporting members having their lower end surfaces disposed in the recesses of the end brackets, a step tread removably mounted on the upper surfaces of the supporting members, said tread and said supporting members being provided with cooperating grooves and projections to prevent relative forward or rearward movement thereof, a pair of leading rollers rotatably mounted on the front portions of the end brackets and a pair of trailing rollers rotatably mounted upon the rear portions of the end brackets.

5. In a moving stairway step, a pair of spaced apart end brackets, a step tread, means for supporting the step tread upon the end brackets, a pair of front axles, resilient means for mounting the front axles upon the front portions of the end brackets with their inner ends separated but in axial alinement with each other, a connecting means for the inner ends of the front axles to maintain said inner ends in alinement with each other, a pair of leading rollers mounted upon the outer ends of the front axles and a pair of trailing rollers rotatably mounted upon the rear ends of the end brackets.

6. In a moving stairway step, a pair of end brackets provided with recesses in their upper surfaces, a pair of parallel spaced apart supporting means having their lower end portions disposed in the recesses in the end brackets, a step tread provided with recesses and projections on its inner surface disposed to engage the upper surfaces of the supporting members, removable means for securing the step tread to the supporting members, a riser having an off-set lower edge and an off-set upper edge disposed to be clamped in a recess on the under side of the step tread and in a recess on the upper side of the end brackets when the step tread is permanently secured in position, a pair of front axles, resilient means for mounting the front axles with their inner ends spaced apart but in axial alinement with each other, removable means for preventing axial displacement of the front axles, a pair of leading rollers rotatably mounted upon the outer end of the front axles, a pair of stub axles, resilient means for mounting the stub axles upon the rear portion of the end brackets, and a pair of trailing rollers rotatably mounted upon the outer end of the stub axles.

7. In a moving stairway, a pair of gear chains disposed in parallel relation, a plurality of sprocket wheels for supporting the gear chains, a pair of parallel tracks, a plurality of steps disposed for operation along the tracks by the gear chains, each step including a pair of leading rollers and a pair of trailing rollers, and a substantially circular track disposed adjacent to each of the sprocket wheels and rotatable independently thereof to provide an arcuate track for each of the trailing rollers as the steps go around the end of the stairway.

8. In a moving stairway, a pair of gear chains disposed in parallel relation, a plurality of sprocket wheels for supporting the gear chains at a landing, a pair of parallel tracks and a plurality of steps disposed for operation along the tracks by the gear chains, each step including a pair of leading rollers and a pair of trailing rollers, and a substantially circular track disposed adjacent to each of the sprocket wheels and mounted concentric therewith and rotatable independently thereof to provide a circular track for each of the trailing rollers as the steps go around the end of the stairway.

9. In a moving stairway, a pair of gear chains disposed in parallel relation, a pair of sprocket wheels for supporting the gear chains at a landing, a pair of parallel tracks and a plurality of steps disposed for operation along the tracks by the gear chains, each step including a pair of leading rollers and a pair of trailing rollers, a substantially circular track disposed adjacent to each of the sprocket wheels and rotatable independently thereof to provide a track for the trailing rollers as the steps go around the end of the stairway, and an arcuate guard rail disposed with its concave surface adjacent to, but spaced apart from each circular track to provide channels for the trailing rollers as the steps go around the end of the stairway.

10. In a stairway, a pair of gear chains disposed in parallel relation, a plurality of sprocket wheels for supporting the gear chains at a landing, a pair of parallel tracks, a plurality of steps disposed for operation along the tracks by the gear chains, each step including a pair of leading rollers and a pair of trailing rollers, a circular track disposed adjacent to each of the sprocket wheels to provide tracks for the trailing rollers as the steps go around the end of the stairway, and arcuate guard rail disposed with its concave surface adjacent to, but spaced apart from each circular track, and resilient means for biasing the arcuate guard rails toward the trailing rollers as the steps move around the end of the stairway.

11. In a moving stairway, a pair of gear chains disposed in parallel relation, a plurality of sprocket wheels for supporting the gear chains at a landing, a pair of parallel tracks, a pair of arcuate tracks disposed around the lower end of the stairway, a plurality of steps for operation along the tracks by the gear chains, each step including a pair of trailing rollers disposed to operate on the parallel tracks and the arcuate tracks, a pair of arcuate guard rails disposed to maintain the trailing rollers in engagement with the arcuate tracks, and a removable segment disposed in each arcuate guard rail whereby the trailing rollers of a step may be lifted out of the stairway when the removable segments are taken out of the arcuate guard rails.

12. In a moving stairway, a pair of gear chains disposed in parallel relation, a plurality of sprocket wheels for supporting the gear chains at a landing, a pair of parallel tracks, a pair of arcuate tracks disposed around the lower end of the stairway, a plurality of steps for operation along the tracks by the gear chains, each step including a pair of trailing rollers disposed to operate on the parallel tracks and the arcuate tracks, a pair of arcuate guard rails disposed to maintain the trailing rollers in engagement with the arcuate tracks, and resilient means for biasing the arcuate guard rails toward engagement with the trailing rollers.

13. In a moving stairway, a pair of gear chains disposed in parallel relation, a plurality of sprocket wheels for supporting the gear chains at a landing, a pair of parallel tracks, a pair of arcuate tracks disposed around the lower end of the stairway, a plurality of steps for operation along the tracks by the gear chains, each step including a pair of trailing rollers disposed to operate on the parallel tracks and the arcuate tracks, a pair of arcuate guard rails disposed to maintain the trailing rollers in engagement with the arcuate tracks, resilient means for biasing the arcuate guard rails toward the arcuate tracks, and a removable segment disposed in each arcuate guard rail whereby the trailing rollers of a step may be lifted out of the track when the removable segments are taken out of the arcuate guard rails.

14. In a moving stairway, a sprocket wheel, an axle for the sprocket wheel, and a circular track disposed on the axle adjacent to the sprocket wheel to constitute a path around the end of the stairway for the steps of the stairway.

15. In a moving stairway, a sprocket wheel, an axle for the sprocket wheel, a circular track disposed on the axle adjacent to the sprocket wheel for rotation with the sprocket wheel, an arcuate guard rail, means for mounting the arcuate guard rail with its concave surface in spaced apart relation to the circular track to provide a channel for a plurality of rollers on the steps of the stairway, and means for biasing the arcuate guard rail toward the circular track.

16. In a moving stairway, a pair of circular tracks for the trailing rollers of the stairway, a pair of arcuate guide rails, means for mounting the arcuate guide rails with their concave surfaces in spaced apart relation with the circular tracks to provide channels through which the trailing rollers may pass, and resilient means for biasing the arcuate guide rail toward the circular tracks for the purpose of maintaining engagement of the trailing rollers with the circular tracks.

JAMES DUNLOP.